(12) United States Patent
Swarts et al.

(10) Patent No.: US 7,069,749 B2
(45) Date of Patent: Jul. 4, 2006

(54) METHOD OF MANUFACTURING A SOLID PREFORM

(75) Inventors: Martinus Johannes Marinus Jozeph Swarts, Veldhoven (NL); Dennis R. Simons, Eindhoven (NL)

(73) Assignee: Draka Fibre Technology B.V., Eindhoven (NL)

( * ) Notice: Subject to any disclaimer, the term of this patent is extended or adjusted under 35 U.S.C. 154(b) by 299 days.

(21) Appl. No.: 10/457,055

(22) Filed: Jun. 5, 2003

(65) Prior Publication Data

US 2004/0050109 A1    Mar. 18, 2004

(30) Foreign Application Priority Data

Jun. 6, 2002  (NL) .................................... 1020781

(51) Int. Cl.
  *C03B 37/07*  (2006.01)
(52) U.S. Cl. ............................ 65/418; 65/419; 65/420; 65/429
(58) Field of Classification Search .................. 65/417, 65/418, 419, 420, 429
See application file for complete search history.

(56) References Cited

U.S. PATENT DOCUMENTS 6,131,413 A    10/2000  Rousseau et al. ............. 65/377
6,821,449 B1 *  11/2004  Caplen et al. ................ 216/24

FOREIGN PATENT DOCUMENTS

| EP | 0 972 752 | 1/2000 |
| EP | 1 035 083 | 9/2000 |
| EP | 1 260 841 | 11/2002 |

* cited by examiner

*Primary Examiner*—Sean Vincent
(74) *Attorney, Agent, or Firm*—Seed IP Law Group PLLC

(57) ABSTRACT

The present invention relates to a method of manufacturing a solid preform by moving a heat source parallel to the longitudinal axis of a substrate tube, whose inner surface is coated with one or more doped or undoped glass layers, so as to collapse the substrate tube into the solid preform in a number of passes, with an etchant being supplied to the interior of the substrate tube after a number of passes of the heat source.

7 Claims, No Drawings

METHOD OF MANUFACTURING A SOLID PREFORM

BACKGROUND OF THE INVENTION

1. Field of the Invention

The present invention relates to a method of manufacturing a solid preform by moving a heat source parallel to the longitudinal axis of a substrate tube, whose inner surface is coated with one or more doped or undoped glass layers, so as to collapse the substrate tube into the solid preform in a number of passes, with an etchant being supplied to the interior of the substrate tube after a number of passes of the heat source.

2. Description of the Related Art

In U.S. Pat. No. 4,793,863, a gaseous etchant is passed through the interior of the substrate tube during the collapsing of the substrate tube for forming the solid preform, which gaseous etchant consists of oxygen and 5–30 vol. % of $C_2F_6$. During the collapsing of the substrate tubes, which are internally coated with glass layers doped with a relatively volatile dopant, for example germanium dioxide, a part of the dopant may evaporate from the glass layers, which results in a disturbance in the refractive index profile. In such a situation, the diffusion of one or more dopants from the glass layers situated further away from the centre will also play a part. Consequently, the profile disturbance has an adverse influence on the optical characteristics of the fibre.

From European patent application No. 1 035 083 there is known a method of preventing such an undesirable deviation in the refractive index profile in the centre of the core, which method comprises the collapsing of the substrate tube in two steps, viz. heating the substrate tube at a first collapsing temperature, for the purpose of decreasing the dimension of the central duct of the substrate tube, flowing an etchant gas through the central duct at a temperature about 200–400° C. lower than the minimum collapsing temperature, for the purpose of etching away part of the core from the central duct of the substrate tube, and subsequently fully collapsing the substrate tube at a second collapsing temperature, which second collapsing temperature is higher than the first collapsing temperature. According to the embodiments described in said document, the inner diameter of the substrate tube during the etching is 5 mm (embodiment 1), 1.5 mm (embodiment 2), and 3 mm (embodiment 3). Said document does not mention the fact that the moment of supplying etchant is critical, however, let alone that the inner diameter of the substrate tube must range within predetermined values along the length thereof.

From U.S. Pat. No. 6,131,413 there are known two embodiments of a method of collapsing a substrate tube, which embodiments are to prevent variations in the core diameter along the longitudinal axis of the final solid preform. According to a first embodiment, a certain value of the pressure at the end of the preform is determined, after which the speed of movement of the heat source is controlled as a function of said pressure value. According to a second embodiment, the flow rate of the etchant is controlled in dependence on the pressure measurement. Further details with regard to the moment of supplying the etchant, in particular with regard to the dimension of the inner diameter of the substrate tube during the etching process are not known from said document.

According to European patent application No. 0 972 752 an optical preform is manufactured according to the rod-in-rod principle. Although said document relates to the manufacture of optical preforms for about 400 km of fibre, using an MCVD process with etching of the interior of the coated substrate tube prior to collapsing, this document does not provide any information with regard to the inner diameter of the substrate tube at the moment of supplying the etchant.

DETAILED DESCRIPTION

Embodiments of a method of manufacturing a solid preform are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present inventors have discovered that it is very important that a uniform amount of material be etched away from the substrate tube along the entire length of the substrate tube to be collapsed in order to obtain a constant refractive index profile of the optical core of the final optical fibre along the length of said fibre. Etching away a uniform amount of material is in particular important in the case of preforms having an index profile which exhibits a gradient in the central part thereof. The fact of the matter is that if it is omitted in the case of such a profile to etch away a uniform amount of material along the length of the substrate tube to be collapsed, this omission will have a major effect on the height of the final index in the central part of the optical fibre.

Consequently, an embodiment of the present invention provides a method of manufacturing a solid preform, in which a uniform amount of material is etched away from the substrate tube to be collapsed along the entire length thereof so as to prevent a disturbance in the core of the refractive index profile of the final optical fibre.

Another embodiment of the present invention provides a method of manufacturing a solid preform, wherein optical preforms can be obtained in which the variations in the height of the refractive index difference amount to less than 5% along the entire length of the substrate tube being collapsed into a solid preform.

One embodiment of the present invention is characterized in that the supplying of etchant takes place the moment the inner diameter of the substrate tube has decreased to a value of 1.5–2.5 mm along the length thereof.

The present inventors have found that the inner diameter of the substrate tube to be collapsed must be substantially constant prior to the etching process, and that the so-called etchant duct must have a diameter of 1.5–2.5 mm, preferably 1.7–2.0 mm, in particular along the entire length of the substrate tube. If a diameter having a value below the aforesaid value is used, less material will be removed during the etching step, as a consequence of which the undesirable dip will remain. In addition, there is a risk that the substrate tube will be closed too early. If an etchant duct having a diameter larger than the aforesaid range of values is used, too much material will be removed during the etching step, which will have an adverse effect on the characteristics of the final optical fibres to be manufactured. In addition, evaporation of the relatively volatile dopant will take place yet upon closing of a substrate tube comprising an etchant duct having a diameter larger than the aforesaid range of values, as a result of which the centre of the refractive index profile of the solid preform will exhibit the aforesaid undesirable dip. It is clear for a person skilled in the art that the substrate tube will never be coated with layers over the whole length thereof. Therefore, its diameter cannot decrease over the total length to its desired range. It should be understood that the definition as used in the present description relates to the inner diameter of the substrate tube where the coated layers are present.

The required constant diameter of the substrate tube can be achieved by making the speed at which the heat source is passed parallel to the longitudinal axis of the substrate tube during the final collapsing pass preceding the etching pass dependent on the pressure drop being measured along the length of the interior of the substrate tube. Consequently, it is preferred to measure the pressure drop along the length of the substrate tube during one or more passes and to relate the speed at which the heat source is being moved parallel to the longitudinal axis of the substrate tube to said pressure drop.

If the pressure drop along the length of the interior of the substrate tube becomes too large, the substrate tube will collapse too much, which signifies that the speed at which the heat source has been moved parallel to the longitudinal axis of the substrate tube has been too low, so that an insufficient amount of material will be removed in the subsequent etching step. If the measured pressure drop along the length of the interior of the substrate tube is too small, the diameter of the etchant duct will be too large, so that too much material will be etched away during the subsequent etching step, which must be prevented by reducing the speed at which the heat source is being moved parallel to the longitudinal axis of the substrate tube.

Preferably, the etchant is a gas selected from the group of $C_2F_6$, $C_3F_8$ and $n-C_4F_{10}$ or $SF_6$, or a combination thereof, possibly in combination with a carrier gas, for example $O_2$.

The present invention will be explained in more detail hereinafter by means of an example and a number of comparative examples, in which connection it should be noted, however, that the present invention is by no means limited to such a special example embodiment.

EXAMPLE 1

A substrate tube having a length of about 1200 mm and comprising layers deposited on the interior surface thereof by means of the PCVD process was collapsed into a solid rod. The aforesaid collapsing process was carried out under the following conditions. A substrate tube was rotated at a speed of 25 revolutions per minute, during which process the space between the tube and the furnace was purged with argon. During said rotation, an electrical resistance furnace having a temperature of about 2200° C. was traversed in axial direction over the tube. The interior of the tube was purged with an oxygen-containing gas during the collapsing process. The first and the second pass were carried out at a furnace speed of about 20 mm/minute. The pressure difference between the intake side and the exhaust side of the substrate tube was about 27 Pa during the second pass with a gas velocity of 1500 sscm $O_2$. At the beginning of the third pass the furnace was moved over the tube at a speed of 20 mm/minute, with an adjusted gas velocity through the tube of 250 sccm $O_2$. During the third pass the velocity of the furnace was adapted on the basis of the measured current pressure difference between the intake side and the exhaust side of the substrate tube: if the pressure difference between the intake side and the exhaust side of the gas exceeded the upper limit at a particular position, the furnace speed was increased, and if the pressure difference was lower than the lower limit, the furnace speed was decreased. As a result of this adjustment of the furnace speed, the inner diameter of the tube was maintained at a value of 1.7–2.0 mm along substantially the entire length of the tube after the third pass and prior to the etching step. This pass was followed by the etching pass, during which an etchant comprising of a gas mixture of $C_2F_6$ and $O_2$ was passed through the interior of the tube, with the furnace being moved over the tube. Following this pass, the final pass was carried out, during which the preform was fully collapsed into a solid rod. Upon measurement of the refractive index profile of the core, the preform exhibited a variation of less than 4% along the usable length of the solid rod.

COMPARATIVE EXAMPLE 1

The same operations as in Example 1 were carried out, with this difference that a constant furnace speed of 18 mm/minute was used during the third pass, with the inner diameter of the tube ranging from 1.0 mm to 1.75 mm along the length of the tube after completion of the third pass. Following the etching pass, the preform was collapsed into a solid rod at a furnace speed of 25 mm/minute. Upon measurement of the refractive index profile of the core, the preform exhibited a dip of more than 20% in the centre of the profile along a major part of the length of the preform. This signified that too little material had been removed during the etching step, and that in addition thereto the duct diameter was not sufficiently constant along the length of the tube during the etching step.

COMPARATIVE EXAMPLE 2

The same operations as in Example 1 were carried out, with this difference that a constant furnace speed of 23 mm/minute was used during the third pass so as to obtain a duct diameter having a value ranging from 2.3 mm to 3.0 mm along the length of the tube after completion of the third pass. Following the etching pass, the preform was collapsed into a solid rod at a furnace speed of 25 mm/minute. The tip of the refractive index profile of the core in the centre of the core of the solid preform exhibited a deviation of −2% from the intended design and a variation of about 10% along the usable length thereof. This signified that too much material had been removed at specific positions in the substrate tube and that in addition the etching behaviour was not sufficiently constant along the usable length. Moreover, an undesirable dip could still be observed in the centre of the refractive index profile at specific positions along the length of the preform.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of manufacturing a solid preform by moving a heat source parallel to a longitudinal axis of a substrate tube, whose inner surface is coated with one or more doped or undoped glass layers, so as to collapse the substrate tube into the solid preform in a number of passes, with an etchant being supplied to an interior of the substrate tube after the number of passes of the heat source, wherein supplying of the etchant takes place a moment that an inner diameter of the substrate tube has decreased to a value of 1.5–2.5 mm along a length thereof, wherein a pressure drop along the length of the interior of the substrate tube is measured during one or more passes and that a speed at which the heat source is being moved parallel to the longitudinal axis of the substrate tube is related thereto.

2. A method according to claim 3 wherein the inner diameter of the substrate tube has decreased along the length thereof to a value ranging from 1.7 to 2.0 mm.

3. A method according to claim 1 wherein the etchant is a gas selected from a group of $C_2F_6$, $C_3F_8$ and n-$C_4F_{10}$ or $SF_6$, or a combination thereof, possibly in combination with a carrier gas.

4. A method of manufacturing a solid perform, the method comprising:

moving a heat source parallel to a longitudinal axis of a substrate tube, the substrate tube having an inner surface coated with at least one glass layer, so as to collapse the substrate tube into the solid preform in a number of passes;

supplying an etchant to an interior of the substrate tube after passes of the heat source, wherein supplying of the etchant is performed when an inner diameter of the substrate tube has decreased to some value along a portion of a length of the substrate tube;

determining a pressure drop along the length of the interior of the substrate tube during at least one of the passes of the heat source to collapse the substrate tube; and controlling, based on the determined pressure drop, a speed at which the heat source is being moved parallel to the longitudinal axis of the substrate tube to collapse the substrate tube.

5. The method of claim 4 wherein controlling the speed at which the heat source is being moved based on the pressure drop includes:

increasing the speed if the determined pressure drop is above a first level; and reducing the speed if the determined pressure drop is below a second level.

6. The method of claim 4 wherein supplying the etchant is performed when the inner diameter of the substrate tube has decreased to the value ranging between 1.5–2.5 mm along the portion of the length of the substrate tube.

7. The method of claim 4 wherein the glass layer can be doped or undoped.

* * * * *

UNITED STATES PATENT AND TRADEMARK OFFICE
CERTIFICATE OF CORRECTION

| | | |
|---|---|---|
| PATENT NO. | : 7,069,749 B2 | |
| APPLICATION NO. | : 10/457055 | |
| DATED | : July 4, 2006 | |
| INVENTOR(S) | : Martinus Johannes Marinus Jozeph Swarts et al. | |

It is certified that error appears in the above-identified patent and that said Letters Patent is hereby corrected as shown below:

<u>Column 5</u>
Line 22, "claim 3" should read as --claim 1--.

Signed and Sealed this

Twenty-eighth Day of August, 2007

JON W. DUDAS
*Director of the United States Patent and Trademark Office*